May 9, 1933. C. L. EKSERGIAN 1,907,762
METHOD OF MAKING ARTILLERY WHEELS
Filed May 16, 1929
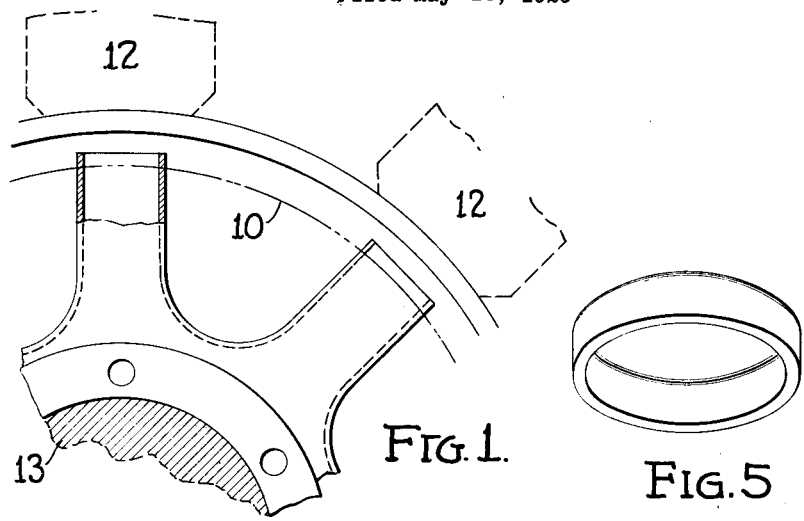
FIG. 1.
FIG. 5.
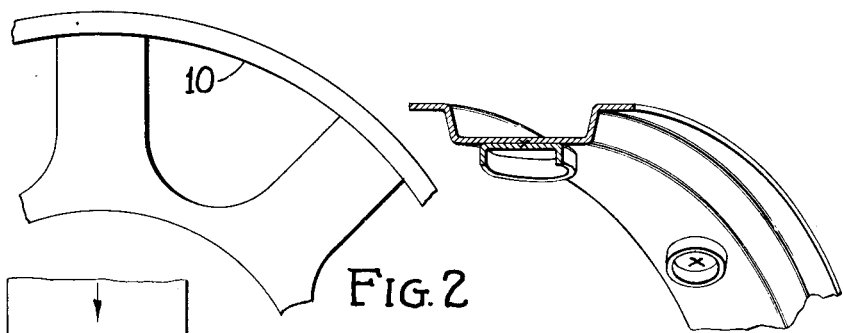
FIG. 2.
FIG. 3.
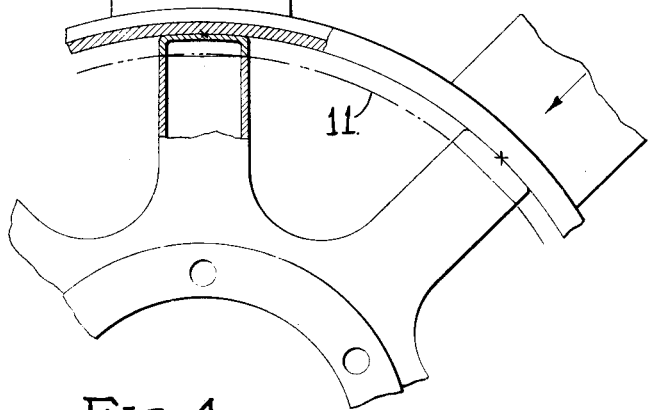
FIG. 4.
INVENTOR.
CAROLUS L. EKSERGIAN
BY
ATTORNEY.

Patented May 9, 1933

1,907,762

UNITED STATES PATENT OFFICE

CAROLUS L. EKSERGIAN, OF DETROIT, MICHIGAN, ASSIGNOR TO BUDD WHEEL COMPANY, OF PHILADELPHIA, PENNSYLVANIA, A CORPORATION OF PENNSYLVANIA

METHOD OF MAKING ARTILLERY WHEELS

Application filed May 16, 1929. Serial No. 363,669.

In the manufacture of metal spoked wheels of the artillery type, according to most of the processes known to me, considerable difficulty is experienced in connecting the spoke ends with the rim. This is particularly true in the case of wheels, the bodies of which are composed of integrally formed die stampings constituting spokes of hollow tubular or semi-tubular form, and the rims of which are formed separately and of relatively heavier stock. Ordinarily, the bodies of such wheels are of light gauge and the rims of relatively heavy gauge. Various expedients for attaching the ends of the spokes to such rims have been devised, the most common of which consist in the provision of closing caps, or of positioning rings connected initially either with the spokes or with the rim. In this type the parts are interlocked in assembly through the caps or rings.

There are various other such expedients. According to my invention I eliminate the necessity for end closing and interlocking caps all together in the majority of forms to my invention, though there are certain forms where a cap construction is of some advantage.

According to the method of my invention, I construct the metal body of the wheel with the spokes radially over length, and concentrically assemble an oversized rim about them I thereafter contract the rim to size and simultaneously flash weld the over-length spokes thereto. By properly adjusting the rate of rim contraction to the proper rate for successful flash welding as dictated by well known flash welding principles, I am able to burn away in the flash the over-length of the spokes and attain at the close of the contracting operation a perfect weld. The welding current can be cut off at any stage of the contracting operation, and the final stage of such operation can be conducted at that rate best suited for the final pressure of the weld.

In Fig. 1 I show a metal spoked wheel body and rim of the character described, concentrically assembled prior to the contracting and welding operations.

In Fig. 2 I show them after the welding operation is complete.

Fig. 3 is a slightly modified form of my invention in which I pre-weld by spot welding or otherwise, shallow metal caps upon the rim.

Fig. 4 shows the completed article after the contacting operation closes.

Fig. 5 shows one of the caps in perspective.

As clearly appears in Fig. 1, a metal spoked body is integrally formed from die stampings, and the spokes thereof are hollow, as indicated by dotted lines. A dotted line circle designated 10 indicates the correct internal diameter of the rim. With reference to it the spokes are all radially over-length. That is to say, the wheel body as a whole, is over-sized. The rim, with respect to the circle 10 of correct size is also over-sized. According to my invention I concentrically contract this rim to the correct dimension as indicated by the circle 10 and simultaneously pass electric current from the rim to the wheel body through the spoke ends as the rim contacts therewith, and thereby weld the rim to the spoke body. By properly adjusting the amount of current and the rate of contracting to each other, and properly cutting off the current at the final stage of the contraction and otherwise paying due heed to well known principles and practices of flash welding, a perfect flash weld can be secured.

The completed product shown in Fig. 2 indicates the coincidence of the inner surface of the rim with the circle 10 of the proper final dimension of interior surface of the rim as shown in Fig. 1, and depicts a completed product.

The body of such wheels are commonly formed by die stamping from relatively light gauge sheet metal, and the wheel of my invention is possessed of such a body. The extra metal of the over-length spokes is burned away as the flash welding proceeds, without impairing the body of the over-sized rim, for that rim is of relatively heavy gauge. By proper adjustment of the length of the spoke, excessive burning away of the rim surface is avoided. This surface will thus be merely heated to the most efficient welding temperature to insure perfect welding without undue burning.

A slightly modified form of my invention is shown in Fig. 3, in which I pre-weld by spot welding or otherwise, shallow metal caps (Fig. 5) upon the rim. The rim and caps together are made over-sized (see dotted lines) as respects the circle 11 of the final joint between the caps and the spoke ends. The metal spoked body comprises spokes radially over-length as respects the circle 11. The contracting operation burns off portions of the spoke ends and also a portion of the walls of the metal caps. As the contracting operation closes, the current is cut off and the circle of the welded joint rendered coincident with the circle 11 as clearly appears in Fig. 4, showing the completed article.

In the instance of this modification the rim needs be contracted doubly, due to the fact that there is substantial burning off of the walls of the caps as well as the ends of the spokes. Burning of the walls of the caps may be controlled to a degree by making these caps relatively heavier in gauge of metal than the gauge of metal from which the spoke bodies are made.

In carrying out the method of my invention I propose to use a standard contracting machine to provide an axial centering means for the spoked body of the wheel with respect to the clamps which are to carry the rim. A machine of this type is shown in the patent to Grotnes 1,407,148 and is well known in the art. Such an arrangement is indicated in dotted lines in Fig. 1, in which the contracting clamps are designated 12, and the centering and clamping device for the spoked wheel body is designated 13. The clamps constitute electrodes contacting with the rim, and are connected with an appropriate source of current supply. The centering device 13 constitutes the electrode for the spoked wheel body, though additional clamps may be provided and of a greater extent, if desired. To complete the machine, it is but necessary to insulate the parts centering, supporting and clamping the wheel body as exemplified by 13, from those centering, contracting and clamping the rim as exemplified by 12. Although my invention will probably find its chief application in connection with closed rims, it might also be applied to rims of the open or split type. Although I have illustrated my invention in connection with a spoked wheel in which the spokes are formed integrally with the hub, it will, of course, be understood that my invention is applicable to wheels having individual spokes of either the hollow or wire type.

My invention is susceptible of other modifications and the annexed claims should be interpreted to comprehend all true modifications.

What I claim is:

1. A method of making metal spoked wheels which consists in forming the spoked body with tubular spokes open at their outer ends, assembling the spoked body in an over-sized rim radially spaced from the outer ends of the spokes, effecting relative radial movement between the rim and the spokes to bring them together by contracting the rim to size, and during the contracting operation and simultaneously therewith, flash welding the open spoke ends to the body of the rim.

2. A method of making metal spoked wheels which consists in forming the spoked bodies separately from the rim and with free ends, assembling an over-sized rim over the ends of the spokes, effecting relative radial movement between the rim and the spokes to bring them together by contracting the rim about the ends of the spokes and simultaneously butt welding all the spokes thereto.

3. A method of making metal spoked wheels which consists in separately forming the metal spoked body with the ends of the spokes free and radially over-sized, assembling a rim over-sized with respect to the wheel body radially spaced from the outer ends of the spokes, effecting relative radial movement between the rim and the spokes to bring them together by contracting the rim to size, and simultaneously flash welding the rim to the spoke ends.

4. A method of assembling a plurality of spokes with a rim, which comprises assembling an over-sized rim about the assembled spokes, radially spaced from the outer ends of the spokes, and effecting relative radial movement between the rim and the spokes to bring them together by contracting the rim to size and butt welding the spokes to the rim.

5. A method of forming spoked wheels which consists in assembling the spokes within a radially over-sized rim, effecting relative radial movement between the rim and the spokes to bring them together by contracting the rim to size and flash welding the rim to the spokes simultaneously with the contracting operation.

6. A method of joining spokes to associated wheel parts which comprises assembling the spokes in fixed relation with the parts to which they are to be attached, effecting relative movement of the spokes and parts toward each other by distorting one of said parts and simultaneously welding the last-named part to the spokes.

In testimony whereof I hereunto affix my signature.

CAROLUS L. EKSERGIAN.